Figure 1:
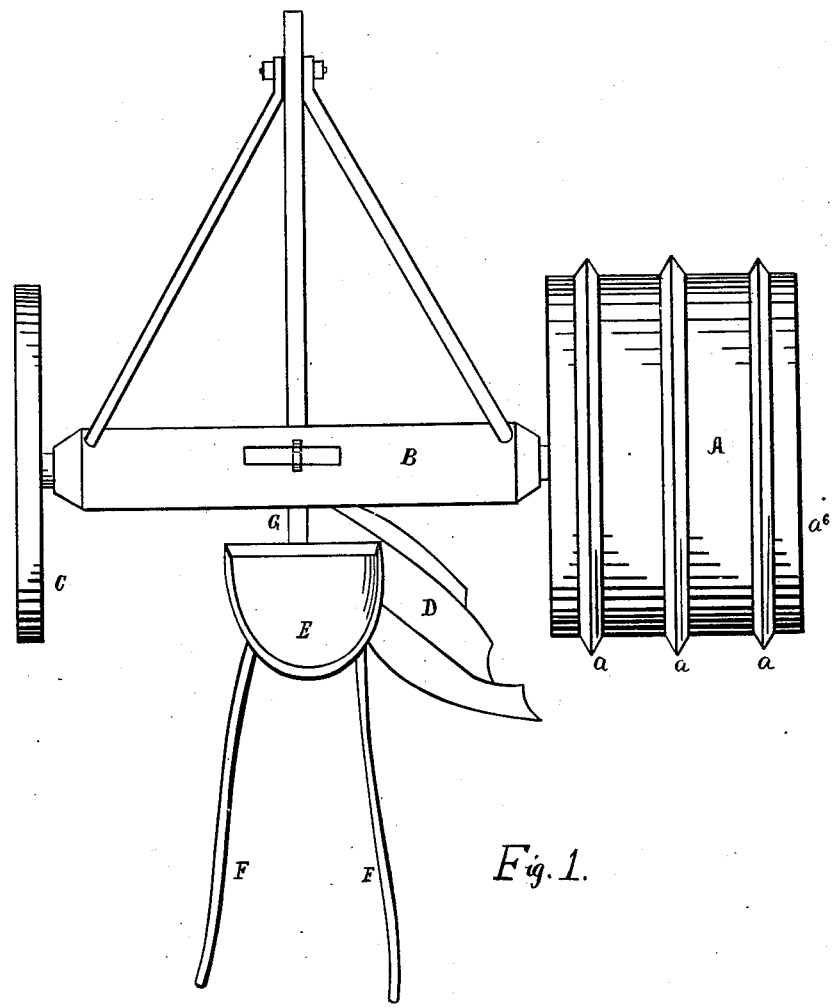

(No Model.) 2 Sheets—Sheet 1.

H. WEDDLE.
COMBINED LAND ROLLER AND PLOW.

No. 313,563. Patented Mar. 10, 1885.

Witnesses.
A. A. Haseltine
M. L. Haseltine

Inventor.
Henry Weddle
By Seward A. Haseltine,
Attorney.

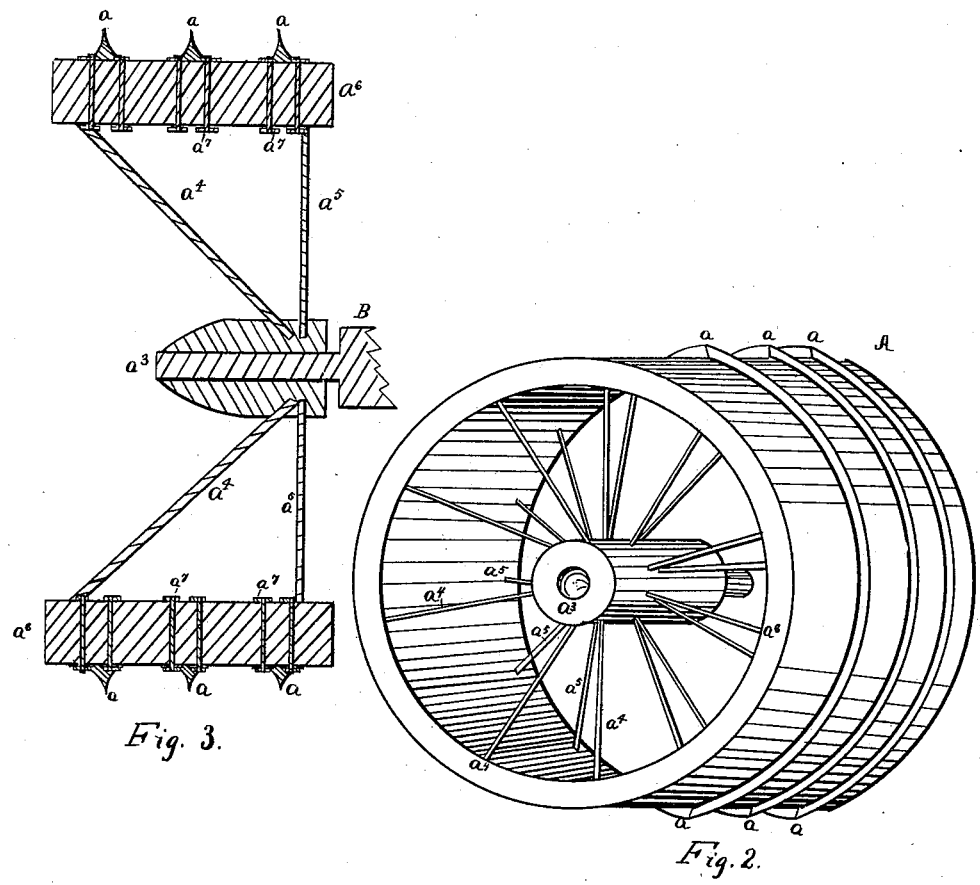

UNITED STATES PATENT OFFICE.

HENRY WEDDLE, OF SHERMAN, TEXAS.

COMBINED LAND-ROLLER AND PLOW.

SPECIFICATION forming part of Letters Patent No. 313,563, dated March 10, 1885.

Application filed August 27, 1884. (No model.)

*To all whom it may concern:*

Be it known that I, HENRY WEDDLE, a citizen of the United States, residing at Sherman, in the county of Grayson and State of Texas, have invented certain new and useful Improvements in Combined Land-Rollers and Plows, of which the following is a specification, reference being had therein to the accompanying drawings.

My invention relates to improvements in combined sulky-plows and land-rollers, the object of which is to provide a light, strong, durable, and convenient device for thoroughly preparing ground for planting. These objects I attain by means of the device illustrated in the accompanying drawings, forming a part of this specification, in which—

Figure 1 is a top or plan view of the entire device. Fig. 2 is a view of the roller detached. Fig. 3 is a sectional view of the roller.

Similar letters indicate corresponding parts in all the figures.

A is a land-roller, made any desired size, width, height, and weight. It is preferably made a little smaller in diameter than the wheel on the landside of the sulky, to cause the plow to set level. The rim $a^6$ is made wide enough to cover one or more furrows, preferably a little more than twice the width of the furrow of the plow with which it is used. $a$ are cutters or cutting-bands, forming a part of or secured to this rim. They are preferably three in number, secured to the rim by means of bolts $a^7$—one at or near the middle and one near each edge of the rim, as shown. These cutters are made sharp, to cut cornstalks, weeds, clods, &c.; but when the ground to be plowed is free from stalks and weeds, and is loose, the cutters $a$ may be removed. This roller has bearings in a hub, $a^3$, upon one end of the axle B of a sulky for plows. Said roller is made so as to be attached to any ordinary sulky for plows. For this purpose the hub $a^3$ is made the ordinary size, and placed near one edge of the roller, the spokes $a^4$ being made long to support the outer edge of the rim $a^6$.

B is an ordinary axle of a common sulky-plow; C, a wheel of the same on the landside.

D is an ordinary plow having a beam, G.

The roller A is placed on the end of the axle, in the place of the wheel that runs in the furrow; but the roller, as described, runs on the plowed ground, (not in the furrow,) so as to smooth the ground as it is plowed. The roller working ahead of the plowshare, the dirt turned from the furrow has time to partially dry before being rolled without getting hard or baked. Thus it smooths it when easiest smoothed, and as the roller is made wide it laps each time, so as to thoroughly level the whole.

I am aware that land-rollers have been made with cutting-bands, and I am also aware that rollers have been attached to sulky-plows. I do not, therefore, claim such construction broadly; but,

Having thus described the construction, use, and operation of my invention, what I claim as new, and desire to secure by Letters Patent, is—

1. In combination with a sulky-plow, a roller, A, having a wide rim, $a^6$, to which are attached cutting-bands $a$, long and short spokes $a^4 a^5$, and a small hub, $a^3$, substantially as shown and described.

2. The combination of a sulky with a light roller, A, composed of a wide rim, $a^6$, to which are bolted cutting-bands $a$, said rim being made smaller in diameter than the other sulky-wheel, and secured to a small hub, $a^3$, by long and short spokes $a^4 a^5$, substantially as shown and described.

In testimony whereof I affix my signature in presence of two witnesses.

HENRY WEDDLE.

Witnesses:
THOS. W. RANDOLPH,
J. F. YOUNG.